United States Patent [19]

Heitz et al.

[11] 4,252,869

[45] Feb. 24, 1981

[54] BY-PASS FOR INTERNALLY OPEN-CIRCUITED CELLS

[75] Inventors: Robert G. Heitz; Robert R. Stringham, both of Concord, Calif.

[73] Assignee: The Dow Chemical Company, Midland, Mich.

[21] Appl. No.: 66,343

[22] Filed: Aug. 13, 1979

[51] Int. Cl.³ .............................................. H01M 2/00
[52] U.S. Cl. ..................................... 429/49; 429/104; 429/121; 429/150; 337/21; 337/331
[58] Field of Search ................ 429/61, 104, 123, 150, 429/121, 93, 7, 49; 337/15, 20, 21, 331; 200/81.6

[56] References Cited

U.S. PATENT DOCUMENTS

| | | | |
|---|---|---|---|
| 418,701 | 1/1890 | Dey | 429/62 |
| 2,624,033 | 12/1952 | Jacquier | 429/7 |
| 3,546,024 | 12/1970 | Niklas | 429/7 |
| 4,011,366 | 3/1977 | Bones et al. | 429/7 |
| 4,025,861 | 5/1977 | Godard et al. | 320/23 |
| 4,097,220 | 6/1978 | Cote | 421/95 A |

FOREIGN PATENT DOCUMENTS 1536143  12/1978  United Kingdom .................... 429/7

OTHER PUBLICATIONS

Hornstra et al., High-Performance Batteries for Off-Peak Energy Storage and Electric-Vehicle Propulsion, Progress Report for Jul.-Sep. 1976, Argonne National Laboratory.
NASA, Technical Brief, LEW-12039, 1976, NTN-77/0584.

*Primary Examiner*—Donald L. Walton
*Attorney, Agent, or Firm*—Robert R. Stringham

[57] ABSTRACT

If one of a series string of battery cells fails on open circuit, the circuit through all of the cells is broken. An automatic means for by-passing the failed cell maintains the circuit and allows operation of the string to continue (at a lower no-lead voltage). The potential difference across the failed cell is utilized to heat a body of a conductive liquid so that it expands, ruptures the ampoule containing it and fills the gap between two conductors, thereby completing a shunt circuit.

14 Claims, 5 Drawing Figures

BY-PASS FOR INTERNALLY OPEN-CIRCUITED CELLS

BACKGROUND OF THE INVENTION

Reference to Related Application

The present invention is disclosed (but not claimed) in a co-pending Application, Ser. No. 972,111, filed Dec. 21, 1978, in the name of R. G. Heitz and entitled "EFFICIENT, HIGH POWER BATTERY MODULE; D.C. TRANSFORMERS AND MULTI-TERMINAL D.C. POWER NETWORKS UTILIZING SAME".

Alkali metal/chalcogen battery cells are subject to a type of failure (irreversible open circuit failure) which has not been commonly experienced with mechanically intact batteries of other types. If just one of a series string of such cells fails on open circuit, the circuit through the entire string is broken.

One of the most important contemplated uses for alkali metal/chalcogen cells—storage of off-peak power—involves charging (and discharge) voltages of up to several hundred kilovolts. To accommodate such voltages, with cells which have no-load potentials of about 2 volts, requires the use of series strings of large numbers of cells. For example, a battery comprising a string of 9100 functioning cells will be required for a nominal working potential of about 18,000 volts.

If a by-pass means is not provided for cells which fail on open circuit, the entire string will be out of service until the bad cell is replaced. This necessitates either a high standby labor cost (for replacing cells as soon as they go bad) or a high capital cost for enough extra batteries to carry the system between periodic maintenance operations.

If a by-pass means is provided, enough extra cells can be included in each string so that the string will not have to be turned off for maintenance until, say, 10% of its component cells have failed. Thus, in an installation for 18,000 volts a string of 10,000 cells, each with an automatic by-pass, would allow 900 cells to fail and be by-passed before the string voltage would drop far enough to require maintenance.

Alkali metal/chalcogen cells, as exemplified by sodium/sulfur cells, can fail on open circuit in several ways. One of these ways is peculiar to the now well known type of cell in which the electrolyte/separator takes the form of a large number of cation-conductive, hair-like hollow fibers, filled with liquid sodium (for example) and immersed in a molten sodium sulfide/sulfur mixture (for example). The sodium which migrates (as $Na^+$ ions) through the fiber walls during discharge is replaced from a reservoir containing sodium in contact with an anodic current collecting means. If the sodium level in the reservoir drops too far, as on overdischarge of the cell or if a fiber failure results in leakage of the sodium out of the reservoir, contact between the sodium and the anodic electron collecting means will be essentially broken and the circuit through the cell develops a high resistance. An effectively irreversible open circuit "failure" has then occurred.

Irreversible open circuit failure can also occur by corrosion of the cathodic current collector, resulting in formation of high resistance surface coatings or even in substantial dissolution of the collector material in the catholyte (at abnormally high temperatures).

The former type of open circuit failure will not occur in types of alkali metal/chalcogen cells in which the hollow fibers are replaced by a single large tube (or by several smaller tubes) into which it is feasible to extend the anodic electron collecting means. However, the latter type of open circuit failure can occur in any such cell in which the cathodic current collecting means (which may consist of or include the catholyte container) is not practically immune to attack by the catholyte at the most elevated temperatures the cell may experience.

Another type of open circuit failure can occur in sodium/sulfur cells of any type if the sodium to sulfur ratio is high enough so that the cell can be overdischarged until the proportion of the sodium ions in the catholyte is sufficient to cause it to solidify. Although it may be possible to reliquify the catholyte by heating the cell to a higher temperature, the failure is —in effect —irreversible at the normal working temperature of the cell. Also, if the cell is of the hollow fiber type, the fibers are likely to be damaged when the catholyte solidifies.

The desirability of a simple by-pass means which can be used one-to-one with individual high temperature battery cells has been recognized. A brief study on the use of copper-oxide electric cut-outs for this purpose was cursorily reported on in a July-September 1976 Progress Report on "High Performance Batteries for Off-Peak Energy Storage and Electrical Vehicle Propulsion", under the heading "Automatic Repair of a Battery Cell With an Open Circuit", by F. Hornstra, E. C. Berrill and S. Faist, Argonne National Laboratory, Argonne, Illinois. The report concluded that further study would be necessary before the use of such cut-outs could be applied successfully to high temperature batteries.

Incorporation in a sodium/sulfur cell of a circuit breaking device responsive to temperature or current is disclosed in U.S. Pat. No. 4,011,366. However, this device does not function as a by-pass and the disclosure of the patent is limited to cells connected in parallel.

A solid-state battery protection system, by means of which each cell in a battery is monitored and any cell which exhibits voltage outside of pre-selected limits is by-passed (and taken out of the circuit), is disclosed in NASA Technical Brief, LEW—12039; Fall 1976; NTN-77/0584. However, this system does not appear to be suitable for high temperature applications.

Accordingly, the prior art does not appear to have provided a workable means for by-passing alkali metal/chalcogen cells which have failed on open circuit.

OBJECTS OF THE INVENTION

It is a primary object of the present invention to provide a specific type of by-pass means whereby a string of cells in series can be kept in operation, even though one or more of those cells has failed on open circuit (has become essentially non-conductive).

A further object is to provide a separate such means connected across each cell and automatically activatable by the development of a high resistance in that particular cell (or cell unit, as subsequently defined herein).

An additional object is to provide a by-pass means which is rugged and simple and requires little or no maintenance to remain reliable in a sulfurous environment.

Another object is to provide such a by-pass which utilizes a liquid metal in a completely closed system.

Still other objects will be made apparent to those skilled in the art by the following specifications.

SUMMARY OF THE INVENTION

The present invention is a specific type of by-pass which is particularly well adapted for use with high temperature battery cells in corrosive atmospheres.

Figure 1:
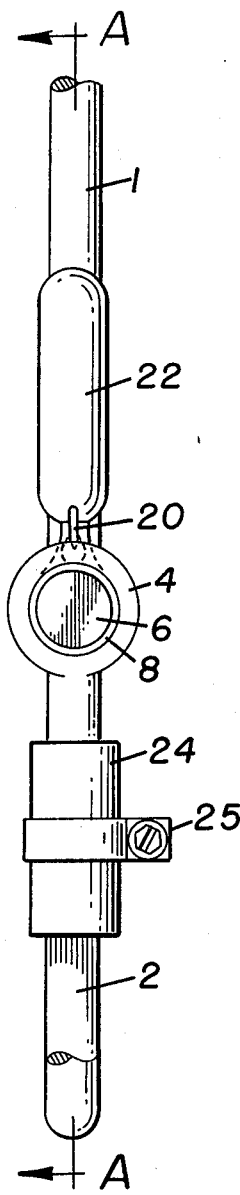
FIG. 1 is an elevational side view of a first by-pass constituting one embodiment of the invention.
Figure 1A:
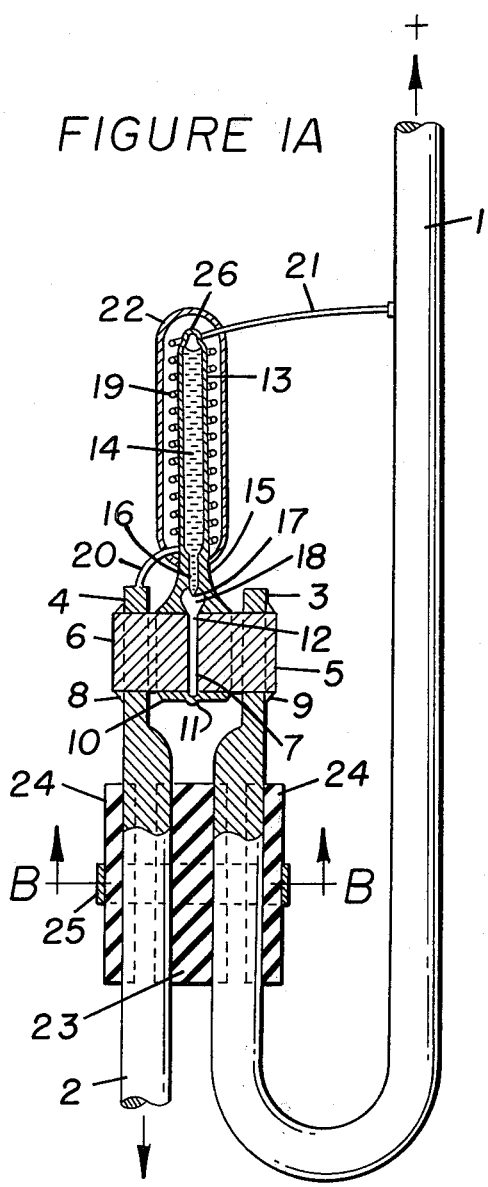
FIG. 1A is an elevational cross-section of the same by-pass.
Figure 1B:
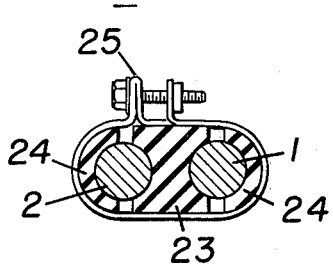

Before defining the invention more precisely, the structure and operation of the by-pass illustrated by the drawings will be summarily described. FIG. 1 is an elevational side view and FIG. 1A is an elevational cross-section of a by-pass comprising two electrical conductors (1,2) having adjacent ends welded to metal cylinders (5,6) which are enclosed in a glass sleeve (10) and separated by a small evacuated gap (7). A body (14) of mercury is sealed in an ampoule (13) which has a thin-walled lower end (17, a tit) and is joined to the glass sleeve in such manner that the mercury will run into and fill the gap if the tit is ruptured. The two conductors are connected through a heating coil (19) which surrounds the ampoule. The "free" ends (not shown) of the conductors are connected to the terminals of one cell in a string of series connected cells. When the cell is operating normally, the voltage drop across it is so low that only a small current flows through the heating coil. However, if the cell develops a high resistance or "opens", the voltage across the heating coil becomes equal to the IR drop per cell times the total number of cells in the string. The mercury in the ampoule is rapidly heated, exerts sufficient expansive force to rupture the tit and runs into the gap, thereby completing a low resistance shunt path around the cell through the conductors.

The several components of the by-pass are so sized, shaped, composed and arranged that the thermal stresses developed in the assembly, when it is heated to the highest temperature it is likely to attain in use, will not be of a magnitude such as to impair its usefulness for its intended function. The by-pass preferably is also protected from mechanical stressing, as by the ceramic positioning blocks (24) and clamp (25) shown (in horizontal cross-section) in FIG. 1-B (and also shown in FIGS. 1 and 1-A).

Figure 2:
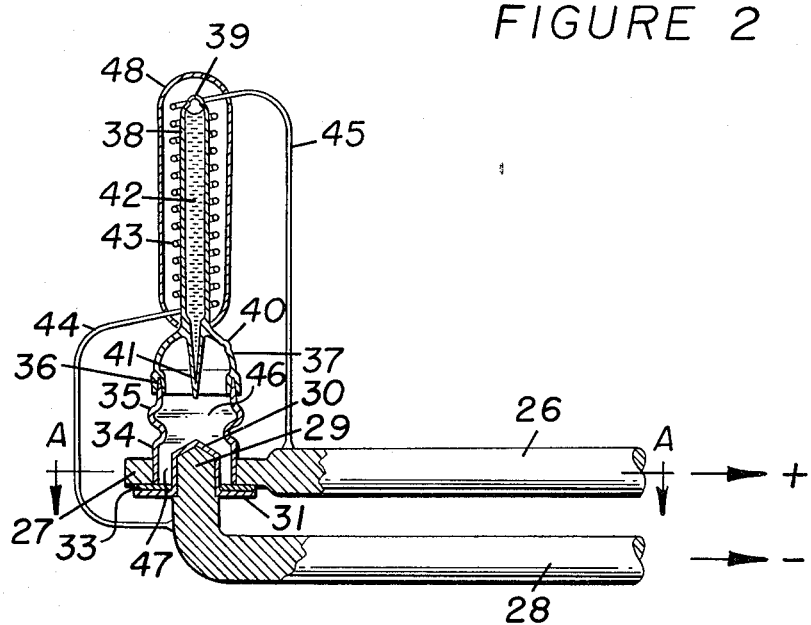
FIGS. 2 and 2A respectively are elevational and plan view cross-sections of a second by-pass which is another embodiment of the invention.
Figure 2A:
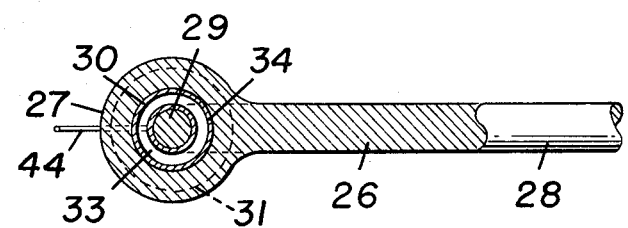

FIG. 2 represents another embodiment of the invention in which the steel cylinders (5 and 6; FIG. 1-A) are replaced by an aluminum sleeve (34) and a flanged aluminum cap (31). One of the end rings (3, FIG. 1-A) is replaced by a rod end (29) which is bent at a 90° angle and centered (with said cap) within the eye of the other end ring (27). The glass sleeve (10, FIG. 1-A) is replaced by two separate glass (33, 37) to thin metal (31 and 36, respectively) seals. The disc-shaped gap (12, FIG. 1-A) takes the form (in FIG. 2) of an annular space (47) and the ampoule is filled with liquid sodium metal (42), rather than mercury. The parallel conductors (26 and 28) are aligned horizontally, rather than vertically.

FIG. 2-A is a cross-section, in plan view, looking down on plane A—A in FIG. 2.

In the following definition of the invention, the term "cell unit" is used in the sense that the term "cell" has heretofore been used and is intended to denote either a single cell or two or more cells connected in parallel as a unit. The cells referred to ordinarily are of a type—such as alkali metal/chalcogen cells—in which "open circuit" failure, or failure by development of a high internal resistance, can occur.

FIGS. 1 and 2 illustrate preferred embodiments of the present invention, which may be defined as a means for automatically establishing a low resistance shunt or by-pass around a battery cell unit, said means comprising:

a. two electrical conductors, a first end of one being adjacent to but separated by a gap from a first end of the other, the second end of each being connectable or connected to a different terminal of said cell unit, b. a closed ampoule containing an electron-conductive material and having a generally tubular skirt extending therefrom, the portion of the wall of said ampoule defined by the juncture therewith of said skirt being a fragile, thin-walled portion shaped and dimensioned so that it will rupture at a lower internal pressure than the rest of said wall, and said material being in an amount and so composed that, if heated to a temperature ($T_1$), it will exert enough pressure to rupture said ampoule wall portion, c. electrically non-conductive sealing means, sealingly engaged with said first conductor ends and with said skirt, and—together with said ends, said skirt and said frangible wall portion—defining an evacuated chamber which comprises said gap, and d. means, automatically responsive to the potential difference between said second ends of said conductors, for heating said material to temperature $T_1$ when said potential difference rises to a preselected voltage;

the above recited components a-d being so sized, shaped, composed and arranged that: (1) said by-pass will not be damaged by the thermal stresses which develop when it is heated to a temperature as high as $T_1$; and (2) when said rupture occurs, said material will flow into said gap, thereby forming an electrical connection between said conductors and completing said shunt.

Also within the ambit of the present invention is a plurality of such by-passes, connected one-to-one in parallel with an equal number of cell units constituting a series string.

Meanings of Terms

The meanings of the terms used in the foregoing definition are as follows.

The term "electrical conductor" is not limited to wires, rods or the like, having the same composition, shape or structure from end to end. It is intended to include composite structures, such as—for example—the one shown in FIGS. 1 and 1-A, in which a shunt rod (1 or 2) of one metal (aluminum) is shaped at one end as an eye (3 or 4) which is slipped onto and welded to a cylindrical end block (5 or 6) of a different metal (steel; which affords a much better match in thermal expansion coefficients with the glass sleeve (10)).

The term "evacuated" means at a sufficienty reduced pressure that the material in the ampoule will flow freely into the gap.

The term "low resistance" means a resistance comparable to or less than the resistance of the cell (in normal operating condition) the by-pass will be used with.

DETAILED DESCRIPTION

It is essential to efficient use of series strings of large numbers of battery cell units to provide a means of by-passing those units which have failed on open circuit (or otherwise) so that the string can continue to be used until enough units have failed to require taking it out of service.

It is also essential, from the standpoints of operability, economics and safety, to provide each cell with protection against excessive current flows, such as may result either from uncorrected line faults or from short-circuiting between or within strings. This is most simply and reliably accomplished by providing each cell with its own (series connected) fuse.

The manner in which the by-pass and fuse means cooperate is illustrated by considering the situation which exists in a battery of about 9100 cell units, each consisting of five hollow fiber type sodium/sulfur cells in parallel. Each cell has its own fuse and a single by-pass means is provided for each cell unit. An average charge-discharge string amperage of 200 amps and a peak amperage of 400 amps is assumed.

Each fuse is rated to "blow" at about 120–150 amperes (and can be a section of the lead from one of the cell electrodes; an aluminum section about 0.06 to 0.08" in diameter, for example). A by-pass, such as the one illustrated in FIG. 1, for example, is connected, as shown, between the pair of conductors (not shown) to which the cell anodes and cathodes are commonly connected. That is, the by-pass means is in parallel with the cells making up the cell unit.

If one of the cells in a given unit of five paralleled cells fails on open circuit, the current through each of the unfailed cells in that unit increases by slightly less than 25% but the voltage drop (load voltage) across the unit does not change to any significant extent and the by-pass is not activated. Similarly, if one cell out of the five fails by short circuiting, its fuse blows and the effect is then the same as though the failed cell had open circuited. If additional cells of the unit fail—by either mode—the current through each of the remaining cells rises but the voltage remains essentially constant. However, if the last cell in the unit fails, by either mode, an arc will form across the cell if the failure is by circuit opening or across the fuse if the cell fails by shorting. The voltage across the cell (unit) will now rise to whatever value the arc will sustain, from a minimum of about 10–20 volts, up to the difference between the open circuit and load voltages across the entire battery (or string of batteries). The by-pass is activated and the arc extinguishes when the shunt is established.

It is apparent from the foregoing that, when used in conjunction with individual cell fuses, the by-pass of the invention may also be used to avoid shut-down of cell unit strings comprising short circuited cells of any type—not just cells subject to open circuit failure.

The construction of the specific by-passes illustrated in the drawings will now be explained in detail.

Referring to FIGS. 1, 1-A and 1-B (approximately 1:1 scale) aluminum leads or "shunt rods" (1 and 2), 0.325 inches in diameter, are connected through expansion loops (not shown) to the + and − cell unit terminals (not shown). The latter rods terminate in end rings (3 and 4) which are of reduced thickness. Each ring is shrunk-fit around an end of a different one of a pair of short, solid, 1010 steel cylinders (5 and 6) extending horizontally toward each other on a common axis and defining a 1/32" gap (7) between their inner faces. The outer ends of the steel cylinders are joined by weld beads (8 and 9) to end rings 4 and 3, respectively. A generally cylindrical, 1990 glass sleeve (10) surrounds and is hermetically joined with the surfaces of each of the steel cylinders 5 and 6 by an intervening thin layer (not shown) of "precoat" glass. The bottom portion of the sleeve is drawn out to form a seal (11) and the top portion is pierced by an opening (12) centered on a vertical diameter (of sleeve 10) which passes through the latter seal. A vertical, cylindrical, 1990 glass ampoule (13), has an upper section with an outer diameter of 0.144 inches and is exactly filled (at 350°–360° C.) with 2.2 grams of mercury (14). It has a flared, thick-walled, lower end (15) which is sealingly engaged with the upper surface of sleeve (10) around opening (12) therein and defines a thick-walled, capillary section (16) of the ampoule which terminates in a fragile, thin-walled tip (17). The latter tip intrudes into a chamber (18) which is defined jointly by member (15) and said upper surface of sleeve (10) and communicates with gap (7) through opening (12). The upper portion of ampoule (13) terminates in seal (26), has an inner diameter of 0.098 inches and is closely surrounded by, but does not touch, a 1.37 inches long heating coil (19) of 43 turns, spaced 0.016 inch apart, formed from a 1.8 foot length of 0.0159 inch diameter (B&S #26) nichrome wire and connected to shunt rods 2 and 1 by leads (20 and 21), respectively. The coil is surrounded in turn by a layer (22) of material equivalent in insulating ability to 0.01 inch of paper (K=62). The relative positions of elements 3–10 are maintained by means of a doubly-grooved, ceramic spacing block (23), two generally hemi-cylindrical saddles (24) and an encircling, screw-adjusted, stainless steel clamp (25).

The by-pass unit of FIG. 1 is fabricated by:

(a) forming the ampoule (13 and 15), from 1990 glass, generally as shown but lacking tip (17) and including a short, open-ended length of small diameter glass tubing (not shown) extending from its top and communicating with the interior of the ampoule, and then utilizing the latter tubing length (to pressurize the ampoule interior) and heat, to form tip (17) as a thin-walled, bottom seal;

(b) applying a thin layer of pre-coat glass (of the type commonly employed in steel enameling) to the portion of each of cylinders 5 and 6 which will be engaged with sleeve (10), slipping the coated ends into a preformed, 1990 glass sleeve having a short side arm of glass tubing attached at its middle circumference, positioning the cylinders so that their adjacent ends are spaced apart about 1/32 inch (to form gap 7) and shrinking the sleeve on and bonding it to the pre-coated cylinder ends;

(c) utilizing the side arm and heat to form an opening (12) in the sleeve diametrically opposite to the side arm;

(d) fusing the flared lower portion (15) of the ampoule to the surface of sleeve (10) around opening (12);

(e) preforming shunt rods 1 and 2 (including the expansion loops) and the end rings 3 and 4, each ring being sized so that it will just slip onto a cylinder end (5 or 6) when both elements are at 400° C.;

(f) heating the ring ends and the sleeve and cylinder assembly to about 400° C.; and slipping the ring ends onto the protruding cylinder ends, in such disposition that the vertical axes of the side arm and the portions of shunt rods 1 and 2 below the end rings are generally parallel to each other;

(g) heating the resulting assembly (and elements 23-25) to a somewhat higher temperature at which the fit of the end rings is loose enough to permit easily adjusting their positions, disposing block (23), saddles (24) and clamp (25) as shown, adjusting the rod end positions until the rod sections below them mate exactly with the block and saddles, tightening the clamp enough to exert a slight compressive force on the rods, forming weld beads (8 and 9) and allowing the assembly to cool slowly to room temperature;

(h) disposing pre-formed coil (19) around the ampoule (13), leads (20 and 21) being already attached to the coil, and welding the free ends of the lead to ring end (4) and shunt rod (1), respectively, as shown;

(i) connecting the assembly to a vacuum line, evacuating the ampoule (13), the chamber (18) and gap (7), melting off the side arm and forming seal (11), charging the ampoule with the mercury (14) and melting off the tubing length and forming seal (26); and (j) emplacing the insulating material (22).

Referring now to the embodiment illustrated in FIGS. 2 and 2-A, the aluminum shunt rods (26 and 28) are 0.325" in diameter. Rod (26) terminates in end ring (27), which is 0.25" thick, has an O.D. of 0.88" and has an I.D. of 0.56". Rod (28) makes a right angle bend just before terminating in an end portion (29) which has a conical tip (not numbered) and, for an axial distance of 0.25", is of reduced thickness (diameter 0.285"). Rod end (29) is tightly fitted in an aluminum cap (30), which has a 0.15" wide, brim-like flange (31) and is 0.02" thick, and the capped rod end is disposed within ring (27). The lower end (not numbered) of an 0.08" thick aluminum sleeve (34) is tightly fitted in ring (27). An intermediate portion (35) of the sleeve is corrugated (has the shape of a short bellows) and the uppermost portion (36) of the sleeve is rapidly tapered, about 0.5" from its end, to a thickness of 0.02" and is then linearly tapered to a terminal thickness of 0.005". The uppermost 0.3" of the tapered section is sealingly engaged with the lowermost portion (not numbered) of a glass skirt (37) which flares down and out from the bottom (not numbered) of an ampoule (38) composed of the same glass (29.5 mole % $Na_2O$, 58.9 mole % $B_2O_3$, 8.7 mole % NaF and 2.9 mole % $MgF_2$), which has a coefficient of expansion of $137 \times 16^{-7}$ units/°C. (0°-300° C.). The ampoule (size exaggerated) is filled (at 350°-360° C.) with 0.2 cc of liquid sodium and is encircled by a nichrome heating coil (43) which is essentially identical to the one represented by FIG. 1-A and is connected by wires (44 and 45) to rods (28) and (26), respectively. Elements (39) and (40) are closures formed after filling the ampoule and evacuating the space (46) enclosed by the skirt (37), the sleeve (34), the cap (30) and a 0.02" × 0.15" ring (33) of glass (94.4 mole % $B_2O_3$ and 5.6 mole % $Na_2O$) which has a thermal coefficient of expansion of $127 \times 10^{-7}$ units/°C. and is sealingly engaged with elements (27) and (31). Space (46) is contiguous with and comprises the annular gap (47; size exaggerated) between elements (30) and (34). A fragile, thin-walled tit (41) is defined by the juncture of the skirt (37) with the bottom (not numbered) of the ampoule (38) and protrudes into space (46). Element (48) is a layer of material equivalent in insulating ability to 0.01" of paper (K=62). The relative positions of the elements of the assembly are maintained by means (not shown) identical to elements (23-25) in FIGS. 1, 1-A and 1-B.

In an equivalent arrangement, rod (26) can be vertically disposed and bent so that end ring (27) is at right angles to the rest of the rod. Rod (28) is also vertically disposed and is not bent.

The by-pass unit of FIG. 2 is fabricated by:
(a) forming the ampoule (38) from the above-described high-soda glass, generally as shown in FIG. 2 but lacking tit (41) and including a short, open-ended length of small diameter glass tubing (not shown) extending from its top and communicating with the interior of the ampoule. Skirt (37) is then formed, essentially as shown but including another length of open glass tubing extending outwardly from it at the location where closure (40) will later be made. Utilizing the tubing at the top of the ampoule, to apply internal pressure, the bottom of the ampoule is heated and extended as tit (41).

(b) Rod end (29) and cap (30) are formed. The cap is heated above 400° C., placed on the unheated rod end and allowed to cool, i.e., is shrunk-fit to the rod end. End ring (27) and sleeve (34) are formed and are shrunk-fit as shown.

(c) The linearly tapered portion of sleeve end (36) is pre-coated (by dipping) with a thin layer of the high-soda glass and then sealingly engaged with the bottom of skirt (37), as shown, by induction heating.

(d) A washer-shaped disc is pre-formed by sintering together a confined body of particles of a solder glass (the above-described $B_2O_3/Na_2O$ glass). This disc is slipped down over cap (30) and positioned on flange (31). Rods (26) and (28) are aligned in parallel and end ring (27) (and sleeve (34)) are positioned with respect to rod end (29) as shown. Heat and pressure are then applied to form element (33), from the sintered glass disc, as a monolithic layer of glass sealingly engaged with the flange (31), the lower edge of sleeve (34) and the lower surface of end ring (27).

(e) The assembly is placed in a dry box under nitrogen and the ampoule is evacuated and charged with an amount of liquid sodium such that the ampoule will just be full at a temperature of about 350°-360° C. The glass tube at the top of the ampoule is then melted off and closure (seal) (39) formed. Space (46) is evacuated, and the other length of tubing is removed and closure (40) formed.

(f) The coil 38 is joined to wires (44) and (45) and slipped down over the ampoule. The free ends of the wires are connected to the shunt rods as shown and the insulation (48) is emplaced.

The key considerations in designing a by-pass unit of the preceding type are as follows.

The unit must operate at voltage differentials (across the cell unit, on open circuit) ranging from the lowest to highest values which can be assumed by the difference between the load and open circuit voltages of the string (battery) comprising the cell unit. Assuming an internal loss of 2.5% and an open circuit battery voltage of from 400 to 20,000 volts, the latter range will be from 10 to 500 volts. At the lower end of the range, the heating coil should provide enough heat to quickly raise the temperature of the mercury (or sodium, etc.) to a value (assume 400° C.) well above that (say 350° C.) required to expand the contents of the ampoule to fully occupy its interior. (It is assumed that only about half of the heat liberated in the coil is taken up by the material in the ampoule.) At the higher end of the voltage range, the mass (heat capacity) of the nichrome coil must be such that although it will probably melt before the metal is expanded enough to rupture the ampoule bottom (at a temperature below the softening temperature of the ampoule glass), the resulting melt will provide enough heat to complete the expansion. The expansion should be completed within a few seconds after it is initiated.

The gap between the conductor ends should be wide enough to ensure that the mercury (or other conductive material) will readily flow into it and the area of contact between the mercury and each rod end should be large enough to ensure an adequately low resistance across the filled gap.

In normal operation, the coil (and the shunt rod sections) constitute a high resistance shunt across the cell unit and the current through this shunt (at a normal voltage differential of about 2 volts) must be negligible in comparison to the normal string (or battery) current. At the voltages and amperages assumed above, the calculated cost of the $RI^2$ loss in the coil of FIG. 1 is 13 cents a year.

Once the shunt circuit has been completed, the relative rates of heat evolution in and heat losses from the shunt rods must be such that the glass employed in the by-pass will not be heated to a temperature above its strain point. For the particular designs described above, the temperature of the shunt rods—assuming a normal shunt current of 200 amperes and application of a radiative coating, such as graphite, to 0.325 inch diameter rods—is estimated to be about 50° C. above the working temperature of the cell unit, i.e., about 350° C. This is well below the strain points of the ampoule glasses used.

A further—and obvious—desideratum is a sufficiently close match in the thermal coefficients of expansion of the glasses and metals that are to be sealingly engaged. The combination of 1010 steel (0.1% carbon) and 1990 glass is well known to provide a close match, whereas a substantially poorer match is attained between aluminum and the porcelains ordinarily employed as enamels for aluminum. Also, aluminum is corroded by mercury. On the other hand, the electrical resistance of steel shunt rods would be excessive. Consequently, a compromise is provided in the design of FIG. 1.

If a material contained in the ampoule is one which corrodes aluminum, the design of FIG. 2 can be utilized by making the cap (30) and sleeve (34) out of a metal (or metals) which will not be corroded. More latitude as to the choice of the metal which will be contacted by the mercury (etc.) is afforded by the design of FIG. 2, since the sleeve and particularly the cap are so thin that the conductivities of the materials they are formed of is of less concern. Also, the assembly procedure for the by-pass of FIG. 2 involves fewer steps and is easier to carry out. An additional advantage is that both glass to metal seals in the latter design involve only thin metal members which can flex as necessary, thereby minimizing thermal stressing of the glass members joined to them.

Since the by-pass unit will be exposed, at temperatures around 300° C., to an atmosphere which may include $H_2S$, sulfur vapors or sulfur oxides, it is essential that the electrical contacts be enclosed within a hermetically sealed casing. In the designs of FIGS. 1 and 2, the contacts—the mercury or sodium and the spaced-apart "conductor" ends—are hermetically sealed within the assembly. Also, heating of the mercury as a liquid, above its boiling point, 358° C., is made possible.

An important feature of the by-passes of FIGS. 1 and 2 is that the shunt rod end portions between which a connection is to be established (by the liquid metal) are parallel to each other and on the same side of the rest of the assembly. This arrangement ensures that the rod ends will move together as the rods expand or contract, thereby avoiding the stressing of the glass members which would otherwise result.

It will be recognized that the by-pass unit of FIGS. 1 and 2 do not provide a direct response to excessive heat evolution in the cell unit, such as can result from a malfunction of the temperature control system in a battery module. This is because high energy cells will generally be irreversibly damaged as a result of reaching temperatures substantially above their intended operating temperatures. Even if the cell is not ruined by reaction of the cathodic current collecting means (or of the anode material) with the catholyte, the heat liberated may be sufficient to require opening the casing—as by means of a fusible plug—to prevent development of an excessive pressure. (However, the cell will fail on open circuit as a consequence of catholyte drainage and the by-pass unit may then be activated by the resultant change in voltage across the cell unit.) Also, in order to activate the by-pass by heat evolution in a single cell in the unit, each cell would have to be provided with its own heat-sensing unit, which would add substantially to the cell unit cost.

Neither is the by-pass unit intended to prevent over- or undercharging of the cells it is associated with. Rather, the monitoring, computor and switching means which will normally be associated with each battery in the installation is relied on for this function.

Those skilled in the art will recognize the materials other than those from which the specific by-passes described herein are constructed may be employed in the practice of the present invention. They will also be able to apply the above-discussed design principles to utilize such other materials in the same or different configurations and for the same or different string currents, cell voltages, etc. The requisite physical and chemical properties of a wide variety of metals, glasses and other conductive and non-conductive materials are well known.

The electron-conductive material presently of choice for use in the ampoule is a liquid metal, such as mercury. However, other materials which, at temperature $T_1$, are conductive liquids and exert a sufficient pressure to rupture the ampoule in the desired manner (and are otherwise suitable) may be employed for that purpose.

Similarly, potential difference—controlled or—responsive means other than a nichrome coil may be employed to heat the ampoule contents. For example, the ampoule itself may be formed of an electron—conductive glass or ceramic material which is bondable to (or identical to) the sleeve material and which has resistance properties such as to function in an equivalent manner to the coil (19) in FIG. 1.

Suitable sealants are not necessarily limited to glasses. Any material which is resistant to sulfurous vapors and to the conductive liquid used and will bond to the metals involved to form a hermetic seal which will maintain its integrity at the requisite operating temperature for the by-pass may be employed.

The foregoing illustrations are not to be construed as limiting the scope of the present invention in a manner inconsistent with the following claims.

What is claimed is:

1. A means for automatically establishing a low resistance shunt or by-pass around a battery cell unit, said means comprising:
   a. two electrical conductors, each having first and second ends, the first end of one being adjacent to but separated by a gap from the first end of the other;
   b. a closed ampoule containing an electron-conductive material and having a generally tubular skirt extending therefrom,
      the portion of the wall of said ampoule defined by the juncture therewith of said skirt being a fragile, thin-walled portion shaped and dimensioned so that it will rupture at a lower internal pressure than the rest of said wall; and said material being in an amount and so composed that, if heated to a temperature ($T_1$), it will exert enough pressure to rupture said ampoule wall portion,
   c. electrically non-conductive sealing means, sealingly engaged with said first conductor ends and with said skirt, and—together with said ends, said skirt and said fragile wall portion—defining an evacuated chamber which comprises or communicates with said gap;
   d. means, automatically responsive to the potential difference between said second ends of said conductors, for heating said material to temperature $T_1$ when said potential difference rises to a pre-selected voltage;

the above recited components a-d being so sized, shaped, composed and arranged that (1) said by-pass will not be damaged by thermal stresses which develop when it is heated to a temperature as high as $T_1$, and (2) when said rupture occurs, said material will flow into said gap, thereby forming an electrical connection between said conductors and completing said shunt.

2. The by-pass means of claim 1 wherein said sealing means is a glass sleeve surrounding and hermetically joined with the surfaces of said adjacent conductor ends and sealingly engaged with said skirt, said sleeve being perforated by an opening connecting said chamber to said gap.

3. The by-pass means of claim 2 in which the adjacent ends of said conductors are opposed faces of two short metal cylinders spaced apart on a common axis and defining said gap between those faces, and
   each of said conductors additionally comprises a length of a metal rod which is joined to the outer end of a different one of said cylinders, said rod lengths being disposed with their axes perpendicular to said common axis and parallel to each other.

4. The by-pass of claim 3 in which the cylinders are steel, the rod lengths are aluminum and terminate in ring-shaped portions disposed around the outer ends of the cylinders and said sleeve is bonded to the surface of each cylinder by a thin, intervening layer of pre-coat glass thereon.

5. The by-pass of claim 1 wherein:
   one of said first conductor ends is in the form of a horizontal ring and the other first end is generally rod shaped and is disposed within said ring, one of said conductors is bent adjacent to its first end and said conductors extend in parallel away from said first ends, said rod-shaped end is fitted in a thin metal cap having a brim-like bottom flange, one end of a generally vertical, thin metal sleeve is fitted inside said ring and said gap is defined by the adjacent surfaces of said cap and sleeve; and
   said sealing means comprises
      an annular glass disc sealingly engaged with said flange and the adjacent surface of said ring, and
      a glass to metal seal between the bottom of said skirt and the upper end of said sleeve.

6. The by-pass of claim 5 in which said conductors, said cap and said metal sleeve are all aluminum and said conductive material is not mercury.

7. The by-pass of any of claims 1-5 in which said conductive material is mercury and the metals contacted by the mercury in operation of the by-pass are resistant to corrosion by mercury.

8. The by-pass means of any of claims 1-5 in which said heating means is a wire coiled around said ampoule and connected between said conductors.

9. The by-pass of claim 8 wherein the heat capacity of said coil is such that even if the coil is melted by the current which passes through it when said potential exceeds said pre-selected voltage, the melt will provide sufficient heat to said conductive material to raise its temperature to $T_1$.

10. The by-pass means of claim 1, connected by said second ends across a cell unit.

11. The by-pass means of claim 10, when said cell unit is one of a string of series connected cell units and said means is one of an equal number of such by-passes connected one-to-one across said cell units.

12. The by-pass means of claim 10, said cell unit being an alkali-metal/chalcogen cell unit.

13. The by-pass means of claim 10, said cell unit being a sodium/sulfur cell unit.

14. The by-pass means of claim 12 when each cell in said unit comprises a plurality of hollow fibers constituting the electrolyte/separator in that cell.

* * * * *